(12) United States Patent
Chalmers

(10) Patent No.: US 10,620,420 B2
(45) Date of Patent: Apr. 14, 2020

(54) OPTICAL SYSTEM FOR USE WITH MICROSCOPE

(71) Applicant: FILMETRICS, INC., San Diego, CA (US)

(72) Inventor: Scott A. Chalmers, San Diego, CA (US)

(73) Assignee: FILMETRICS, INC., San Diego, CA (US)

( * ) Notice: Subject to any disclaimer, the term of this patent is extended or adjusted under 35 U.S.C. 154(b) by 313 days.

(21) Appl. No.: 15/273,995

(22) Filed: Sep. 23, 2016

(65) Prior Publication Data
US 2017/0108688 A1  Apr. 20, 2017

Related U.S. Application Data

(60) Provisional application No. 62/222,584, filed on Sep. 23, 2015.

(51) Int. Cl.
| | |
|---|---|
| *G02B 21/36* | (2006.01) |
| *H04N 5/232* | (2006.01) |
| *G02B 21/08* | (2006.01) |
| *G02B 21/24* | (2006.01) |

(52) U.S. Cl.
CPC ......... *G02B 21/361* (2013.01); *G02B 21/082* (2013.01); *G02B 21/241* (2013.01); *G02B 21/248* (2013.01); *G02B 21/362* (2013.01); *H04N 5/23212* (2013.01)

(58) Field of Classification Search
CPC .... H04N 19/597; H04N 19/463; H04N 19/52; H04N 19/96; H04N 19/119; H04N 19/14; H04N 19/176; H04N 5/23212; G02B 21/361; G02B 21/082; G02B 21/241; G02B 21/248; G02B 21/362
USPC .................................................... 375/240.12
See application file for complete search history.

(56) References Cited

U.S. PATENT DOCUMENTS

| | | | | |
|---|---|---|---|---|
| 6,226,118 B1 * | 5/2001 | Koyama | ........ | G02B 7/16 359/379 |
| 2002/0093648 A1 * | 7/2002 | Nikoonahad | ........ | G01N 21/211 356/237.1 |
| 2009/0201494 A1 * | 8/2009 | Furman | ........ | G01N 21/9501 356/237.5 |

* cited by examiner

*Primary Examiner* — William C Vaughn, Jr.
*Assistant Examiner* — Jae N Noh
(74) *Attorney, Agent, or Firm* — Hodgson Russ LLP

(57) ABSTRACT

Embodiments include a spectral reflectance system comprising a detector and a light source coupled to a support member. The system includes a turret coupled to the support member. The turret is configured to receive objective lenses and configured to selectively position each lens in an imaging position relative to a sample to be imaged. A first objective lens is configured to image the sample at the detector when placed in the imaging position. A second objective lens includes an optical director that is configured to form an optical path with an auxiliary detector and image the sample at the auxiliary detector when the second objective lens is in the imaging position.

21 Claims, 5 Drawing Sheets

OPTICAL SYSTEM FOR USE WITH MICROSCOPE

RELATED APPLICATION

This application claims the benefit of United States U.S. Patent Application No. 62/222,584, filed Sep. 23, 2015.

TECHNICAL FIELD

This invention relates generally to the field of electro-optical instrumentation and, more particularly, to systems and methods of microscopes.

BACKGROUND

There is a need for optical microscopes that are configurable for imaging tasks using capabilities beyond those of conventional microscope components.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

DETAILED DESCRIPTION

Embodiments include a spectral reflectance system comprising a detector and a light source coupled to a support member. The system includes a turret coupled to the support member. The turret is configured to receive objective lenses and configured to selectively position each lens in an imaging position relative to a sample to be imaged. A first objective lens is configured to image the sample at the detector when placed in the imaging position. A second objective lens includes an optical director that is configured to form an optical path with an auxiliary detector and image the sample at the auxiliary detector when the second objective lens is in the imaging position.

In the following description, numerous specific details are introduced to provide a thorough understanding of and enabling description for, embodiments of the reflectance systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
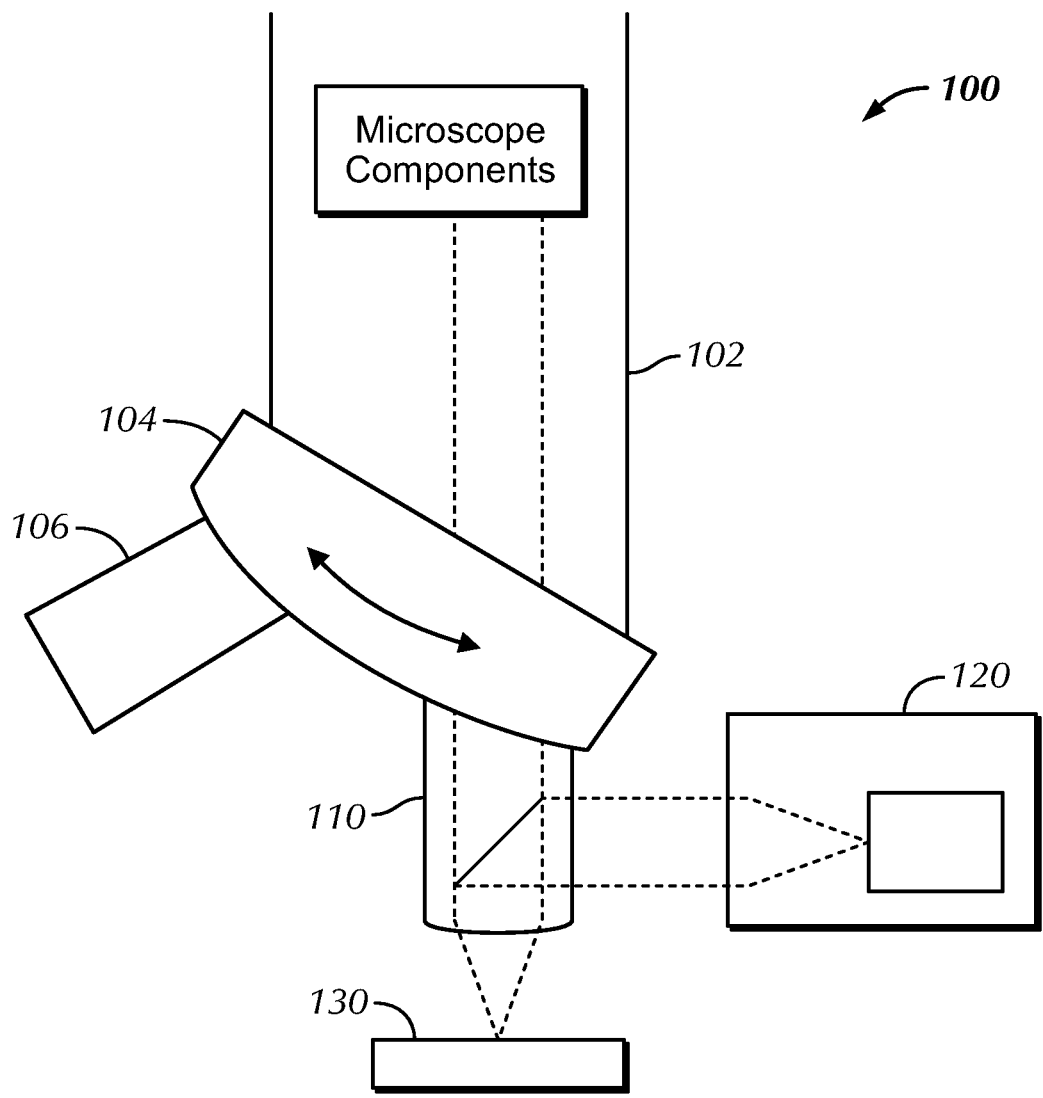
FIG. 1 is a block diagram of an optical subsystem for use with a conventional microscope system, under an embodiment.

FIG. 1 is a block diagram of an optical subsystem for use with a microscope system 100, under an embodiment. The optical subsystem includes one or more custom objectives 110 and an auxiliary subsystem 120 including one or more of an auxiliary detector and auxiliary light source, as described in detail herein. The microscope system includes semiconductor microscopes for example, but is not so limited.

The microscope includes an on-board light source (not shown) and detector (not shown) coupled or connected to a support member 102, or housed within the support member 102. The support member 102 includes, for example, a frame or other support or component of the microscope, but is not so limited. A turret 104 is moveably coupled to the support member 102, and in an example embodiment is configured for movement via rotation. The turret 104 is configured to receive a number of objective lenses 106 and 110, and the moveable (e.g., rotatable) configuration of the turret 104 functions to allow selective positioning of each of the objective lenses 106 and 110 in an imaging position relative to a sample 130 being imaged. The objective lenses include conventional objectives 106 that, when positioned in the imaging position using the turret 104, are configured for conventional microscope imaging operations, namely imaging the sample 130 at the microscope on-board detector (not shown) using illumination directed at the sample from the microscope on-board light source (not shown).

The microscope system objectives of an embodiment include custom objectives 110 configured to couple or connect to the turret 104 in a manner similar to conventional objectives. However, the custom objectives 110 are "custom" because they function in or include various configurations that are not compatible with at least some portion of the host microscope subsystems (e.g., optics, electronics, detector, etc.). For example, custom objectives 110 of embodiments are configured for use with auxiliary sensors or detectors having different configurations and/or functions (e.g., different wavelength detection range(s), different processing routine(s), etc.) from the conventional host microscope detector. As another example, custom objectives of embodiments are configured for use with auxiliary light sources having different configurations and/or functions (e.g., wavelengths, radiation source type, etc.) from the conventional host microscope light source.

Figure 2:
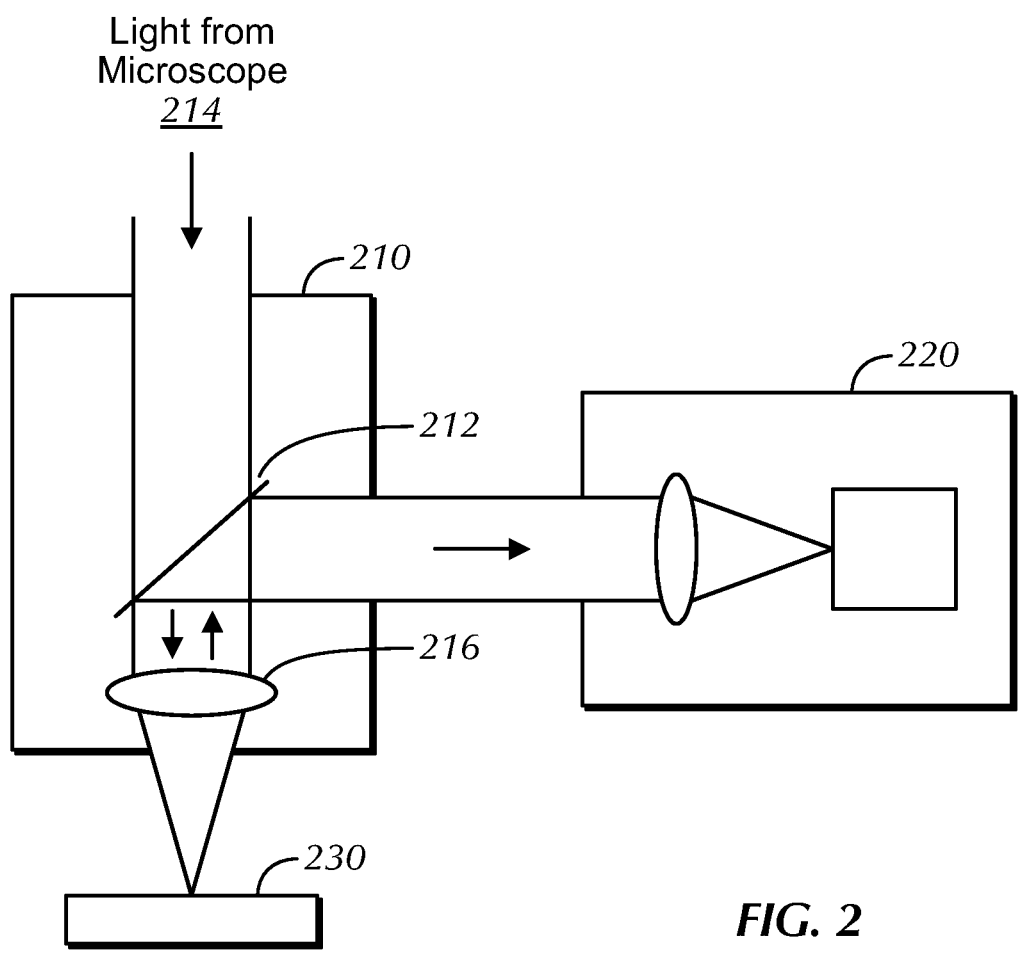
FIG. 2 is a block diagram of an optical subsystem including a custom objective and an auxiliary detector, under an embodiment.

Custom objectives of embodiments include objectives configured to illuminate the sample with light from the host microphone light source, and image the sample with an auxiliary detector different from the detector of the host microscope by directing light reflected from the sample to the auxiliary detector. FIG. 2 is a block diagram of an optical subsystem including a custom objective 210 and an auxiliary detector 220, under an embodiment. The custom objective 210 includes an optical director 212 configured to direct or couple light 214 from the host microscope light source (not shown) to the sample 230 when the custom objective 210 is placed in the imaging position via the turret. The light source (not shown) includes, for example, one or more of a white light, Xenon lamp, Halogen lamp, and laser, but is not so limited. The optical director 212 includes, for example, one or more of a beam splitter, a mirror, and a series of mirrors, but is not so limited. The objective 210 also includes a lens 216 in the optical path between the optical director 212 and the target region of the sample 230, but is not so limited.

The optical director 212 of the custom objective 210 is configured to direct light reflected or returned from the sample 230 to the auxiliary detector 220 via an optical path formed between the objective 210 and the auxiliary detector 220. The auxiliary detector 220, which in this example is independent of the host microscope detector, is positioned adjacent the imaging position of the objective 210 and forms an optical path with the optical director 212 of the objective 210 when the objective 210 is in the imaging position. The light is directed from the optical director 212 to the detector 220 via an orifice (e.g., port, window, sight, etc.) appropriately positioned in a region of the objective tube, but is not so limited. The detector 220 includes, for example, one or more of a spectrometer, a sensor, a charge coupled device (CCD) camera, and a complementary metal-oxide semiconductor (CMOS) camera, to name a few.

The auxiliary detector 220 is configured to maintain a stable position (e.g., horizontal, vertical, etc.) relative to the objective 210 in the imaging position. In an embodiment, the auxiliary detector 220 is coupled or connected to the support member of the host microscope. Alternatively, the auxiliary detector 220 is coupled or connected to the turret support of the host microscope so that movement of the turret results in movement of the detector. The connection between the auxiliary detector 220 and the support member is fixed in embodiments, but alternatively the connection is moveable or adjustable.

While this example embodiment describes the auxiliary detector as being independent (e.g., physical, electrical, etc.) from the host microscope detector, it is not so limited. For example, the auxiliary detector of an embodiment is configured for mounting on a support structure of the host microscope. The auxiliary detector of an alternative embodiment is configured to electrically couple to/with one or more electronic components of the host microscope.

Figure 3:
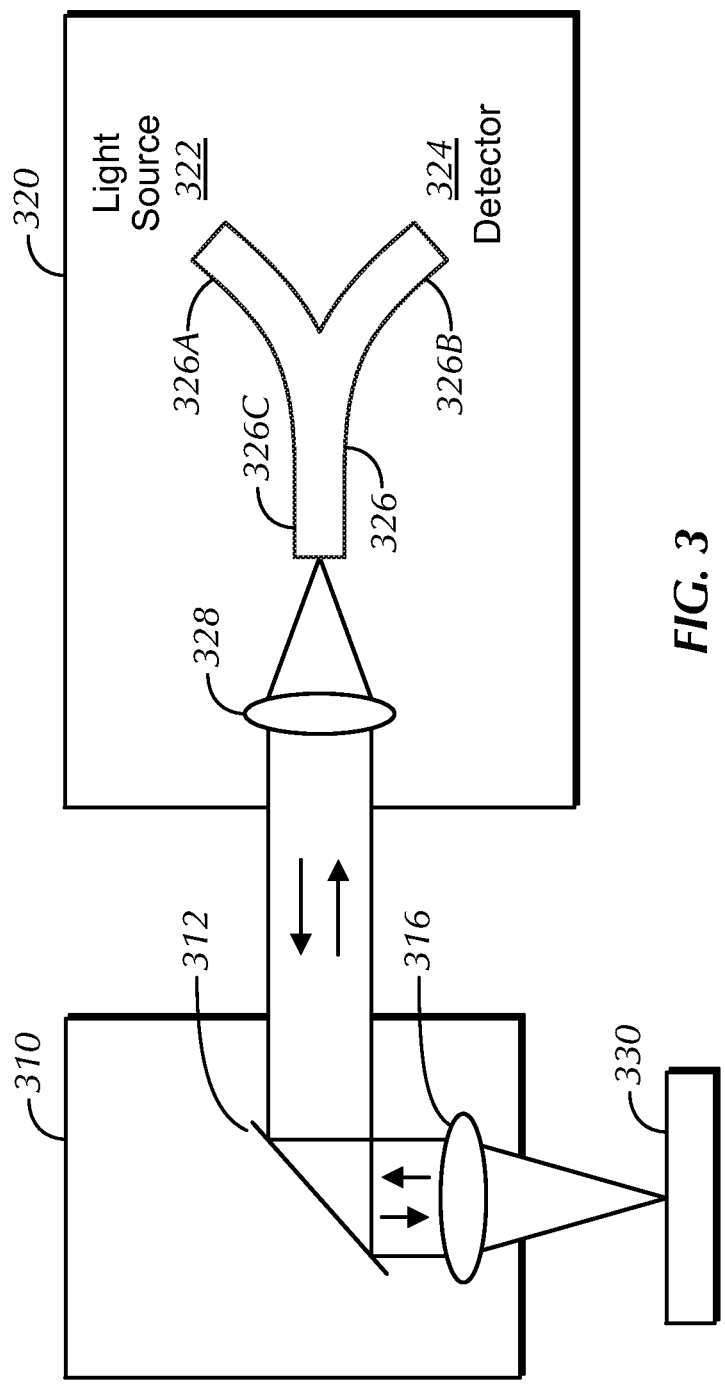
FIG. 3 is a block diagram of an optical subsystem including a custom objective and an auxiliary light source and detector, under an embodiment.

Custom objectives of alternative embodiments include objectives configured to illuminate the sample with light from an auxiliary light source, and image the sample with an auxiliary detector different from the detector of the host microscope. FIG. 3 is a block diagram of an optical subsystem including a custom objective 310 and an auxiliary subsystem or device 320 comprising an auxiliary light source 322 and detector 324, under an embodiment. While the auxiliary light source 322 and detector 324 of this example are described as components of a single auxiliary subsystem or device, it is not so limited and in various alternatives can include multiple subsystems or components of multiple subsystems.

The custom objective 310 of this embodiment includes an optical director 312 configured to direct or couple light from the auxiliary light source 322 to the sample 330 via an optical path formed when the custom objective 310 is in the imaging position. The auxiliary light source 322 includes, for example, one or more of a white light, Xenon lamp, Halogen lamp, and laser, but is not so limited. The optical director 312 includes, for example, one or more of a beam splitter, a mirror, and a series of mirrors, but is not so limited. The light is directed from the auxiliary light source 322 to the optical director via a coupler 326 and an orifice (e.g., port, window, sight, etc.) appropriately positioned in a region of the objective tube. The objective also includes a lens 316 in the optical path between the optical director and the target region of the sample, but is not so limited.

The optical director 312 is further configured to direct light reflected or returned from the sample 330 to the auxiliary detector 320 via the optical path formed between the objective 310 and the auxiliary detector 320. The auxiliary detector 320, which in this example is independent of the host microscope detector, is positioned adjacent the imaging position of the objective 310 and forms an optical path with the optical director 312 of the objective 310 when it is in the imaging position. The light is directed from the optical director 312 to the detector 320 via the orifice of the objective tube, but is not so limited. The detector 320 includes, for example, one or more of a spectrometer, a sensor, a charge coupled device (CCD) camera, and a complementary metal-oxide semiconductor (CMOS) camera, to name a few.

The auxiliary device 320, including the auxiliary light source 322 and detector 324, is positioned adjacent the imaging position of the turret and forms an optical path with the optical director of the custom objective when the custom objective is in the imaging position. As such, the auxiliary device 320, and hence the auxiliary light source 322 and detector 324, is configured to maintain a stable position (e.g., horizontal, vertical, etc.) relative to the objective 310 in the imaging position. In an embodiment, the auxiliary device 320 is connected to the support member of the host microscope. Alternatively, the auxiliary device 320 is connected to the turret support of the host microscope so that movement of the turret results in movement of the light source. The connection between the auxiliary device 320 and the support member is fixed in embodiments, but alternatively the connection is moveable or adjustable.

The auxiliary subsystem 320 configuration of this example embodiment includes a fiber-optic coupler 326 to which the light source 322 and detector 324 are coupled, but the embodiment is not so limited. The coupler 326, an example of which is available from OZ Optics (www.ozoptics.com), allows both outgoing illumination light and returning reflected light to travel in the same common end 326C of the coupler 326. The illumination light is coupled to or passes into an input or first branch 326A of the coupler 326 from the auxiliary light source 322, and is output through a common branch 326C of the coupler 326 where it is directed at the optical director 312 of the custom objective 310.

Light reflected from the target region of the sample 330 returns and forms an image at the optical director 312. The optical director 312 concentrates the image onto the end of the common branch 326C of the coupler 326. The coupler 326 directs or couples the light to an output or third branch 326B of the fiber-optic coupler 326, which is configured to couple or transmit the light to the detector 324 (e.g., spectrometer, sensor, charge coupled device (CCD) camera, complementary metal-oxide semiconductor (CMOS) camera, etc.).

This example embodiment describes the auxiliary light source as being independent (e.g., physical, electrical, etc.) from the host microscope components, but it is not so limited. For example, the auxiliary light source of an embodiment is configured for mounting on a support structure of the host microscope. Furthermore, the auxiliary light source of an alternative embodiment is configured to electrically couple to/with one or more electronic components (e.g., controller, light source, etc.) of the host microscope.

Similarly, this example embodiment describes the auxiliary detector as being independent (e.g., physical, electrical, etc.) from the host microscope components, but it is not so limited. For example, the auxiliary detector of an embodiment is configured for mounting on a support structure of the host microscope. Furthermore, the auxiliary detector of an alternative embodiment is configured to electrically couple to/with one or more electronic components (e.g., controller, detector, etc.) of the host microscope.

Figure 4:
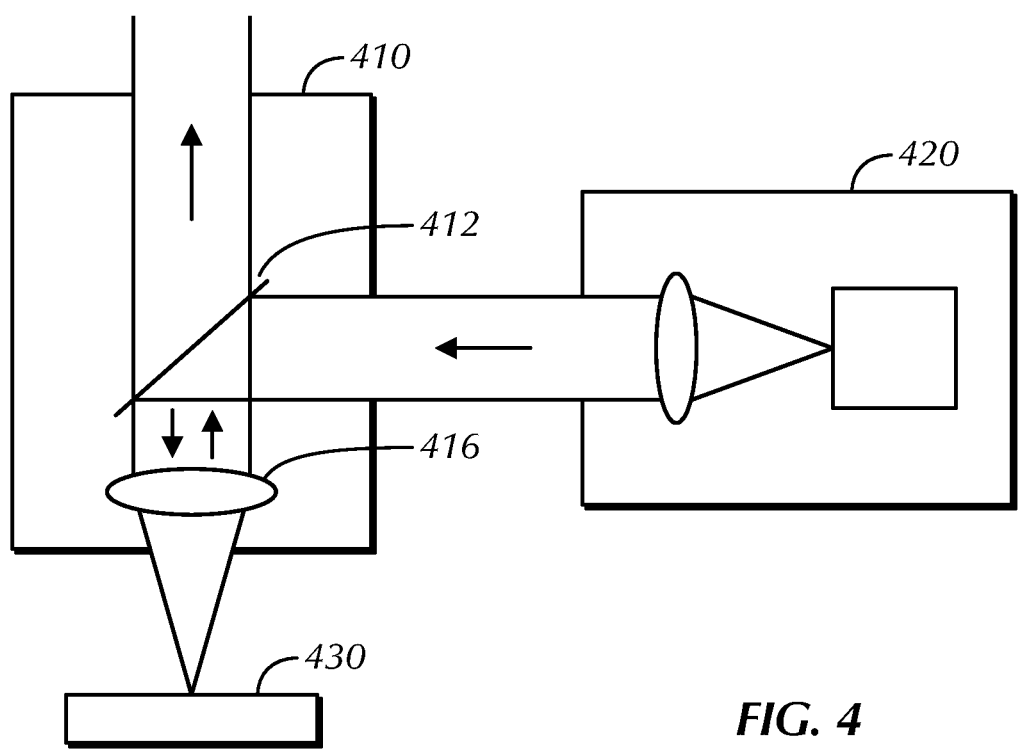
FIG. 4 is a block diagram of an optical subsystem including a custom objective and an auxiliary light source, under an embodiment.

Custom objectives of additional alternative embodiments include objectives configured to illuminate the sample with light directed from an auxiliary light source different from the light source of the host microscope, and image the sample at the host microscope detector by directing light reflected from the sample to the host detector. FIG. 4 is a block diagram of an optical subsystem including a custom objective 410 and an auxiliary light source 420, under an embodiment. The custom objective 410 includes an optical director 412 configured to direct or couple light 414 from the auxiliary light source to the sample 430 when the custom objective 410 is in the imaging position. The light is directed from the auxiliary light source to the optical director 412 via an orifice (e.g., port, window, sight, etc.) appropriately positioned in a region of the objective tube, but is not so limited. The light source (not shown) includes, for example, one or more of a white light, Xenon lamp, Halogen lamp, and laser, but is not so limited. The optical director 412 includes, for example, one or more of a beam splitter, a mirror, and a series of mirrors, but is not so limited. The objective 410 also includes a lens 416 in the optical path between the optical director 412 and the target region of the sample 430, but is not so limited.

The optical director 412 of the custom objective 410 is configured to direct light reflected or returned from the sample 430 to the host microscope on-board detector (not shown) via an optical path formed between the objective 410 and the detector. The detector forms an optical path with the optical director 412 of the objective 410 when it is in the imaging position. The detector includes, for example, one or more of a spectrometer, a sensor, a charge coupled device (CCD) camera, and a complementary metal-oxide semiconductor (CMOS) camera, to name a few.

The auxiliary light source 420 is configured to maintain a stable position (e.g., horizontal, vertical, etc.) relative to the objective 410 in the imaging position. In an embodiment, the auxiliary light source 420 is connected to the support member of the host microscope. Alternatively, the auxiliary light source 420 is connected to the turret support of the host microscope so that movement of the turret results in movement of the detector. The connection between the auxiliary light source 420 and the support member is fixed in embodiments, but alternatively the connection is moveable or adjustable.

While this example embodiment describes the auxiliary light source as being independent (e.g., physical, electrical, etc.) from the host microscope light source, it is not so limited. For example, the auxiliary light source of an embodiment is configured for mounting on a support structure of the host microscope. The auxiliary light source of an alternative embodiment is configured to electrically couple to/with electronic components of the host microscope.

Figure 5:
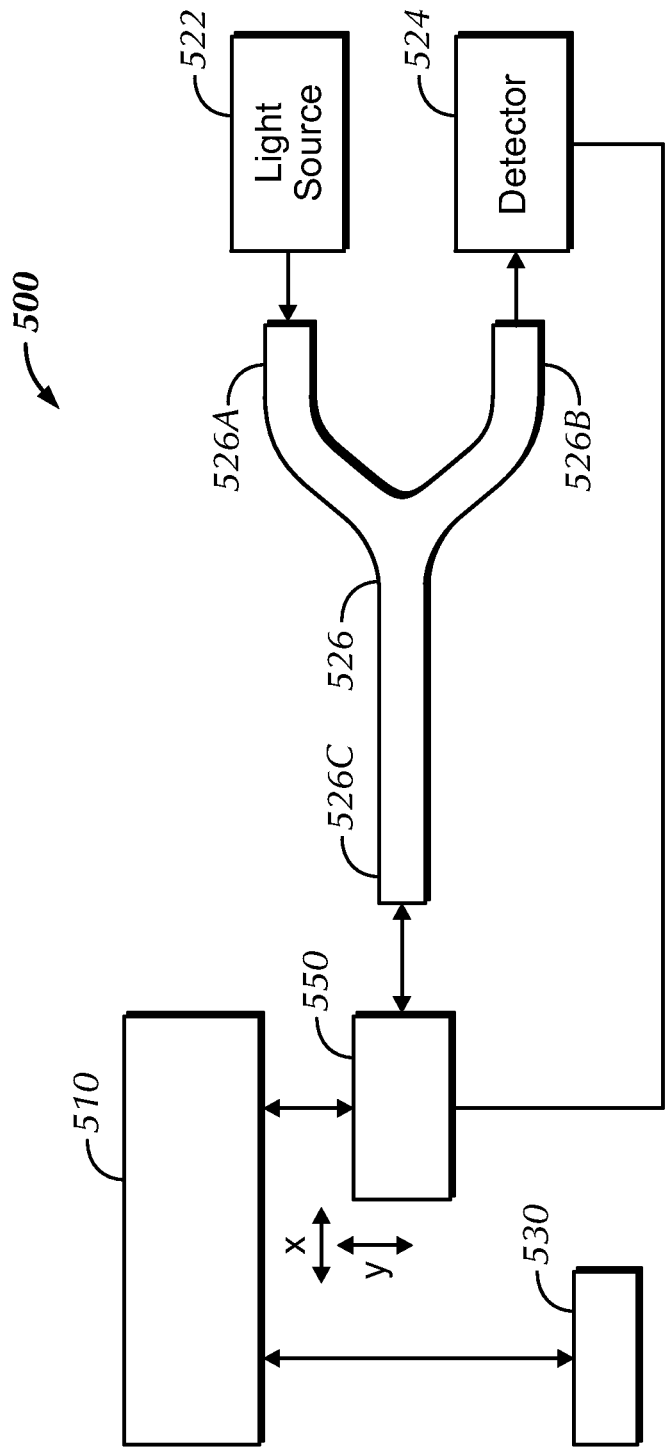
FIG. 5 is a block diagram of an optical subsystem including a focusing system, under an embodiment.

The optical subsystem of embodiments can include a focusing system, an example of which is described in detail in U.S. patent application Ser. No. 15/273,876, which is herein incorporated by reference in its entirety. FIG. 5 is a block diagram of an optical subsystem 500 including a focusing system 550, under an embodiment. The system 500 is configured so that light illuminating the sample and light reflected from the sample take a similar path through the system. The system 500 includes an auxiliary light source 522 and detector 524 along with a fiber-optic coupler 526. The coupler 526, an example of which is available from OZ Optics (www.ozoptics.com), allows both outgoing illumination light and returning reflected light to travel in the same common end 526C of the coupler 526. The illumination light is coupled to or passes into an input or first branch 526A of the coupler 526 from the light source 502, and is output through a common branch 526C of the coupler 526 where it is directed at a focusing system 550.

The focusing system or device 550, which includes at least one of a lens and a focusing mirror (not shown), is configured to couple the light to an optical device or director 510 that is configured to redirect the light to illuminate points or regions of the surface of a sample 530. The optical director 510, which is a component of a custom objective as described herein, includes optical component(s) configured to direct incident light from the light source 502 to the sample 530, and to direct reflected light from the sample 530 to the detector 524. For example, the optical director of an embodiment comprises retroreflector mirrors, but is not so limited. Light reflected from the surface of the sample 530 returns and forms an image at the optical director 510. The optical director 510 redirects the image to the focusing system 550, which concentrates it onto the end of the common branch 526C of the coupler 526. The coupler 526 directs or couples the light to an output or third branch 526B of the fiber-optic coupler 526, which is configured to couple or transmit the light to the detector 524 (e.g., spectrometer, sensor, charge coupled device (CCD) camera, complementary metal-oxide semiconductor (CMOS) camera, etc.).

The source aperture (fiber end) of the first branch 526A of the coupler 526 is imaged directly on the detector aperture (fiber end) of the third branch 526B of the coupler 526 when the sample is in focus (minimal underfill and/or overfill), and this condition produces a maximum signal strength at the detector. Consequently, the focus condition of the sample can be determined using the signal strength of the signal received at the detector 524. The system of an embodiment is configured to automatically control/adjust the focus of the sample 530 by controlling a position of a component of the system using information of the received signal strength at the detector 524 in order to achieve maximum signal strength at the detector 524, and hence best focus.

The system of an embodiment automatically controls focus of the sample at the detector 524 with a focusing system 550 positioned or coupled in the optical path between the common branch 526C of the coupler 526 and the optical director 510. The focusing system 550, which receives information of the signal received at the detector 524, is configured to control focus of the sample at the detector 524 in response to the detector signal by using information or data of the detector signal to control a position of one or more components of the focusing system 550. The position of the focusing system component is controlled relative to at least one of the coupler 526 and the optical director 510, but is not so limited. The focusing system 550 of an embodiment includes at least one positioning component (e.g., motor, stage, mount, gimbal, etc.) configured to control positioning of a light-directing component (e.g., mirror, etc.) along at least two axes X and Y relative to at least one of the coupler 526 and the optical director 510. The focusing system 550 is therefore configured to control the focus of coupled light, but the embodiment is not so limited.

Alternatively, the system of an embodiment is configured to automatically control focus of the sample at the detector 524 with a focusing system 550 coupled to the optical director 510. The focusing system 550, which receives information of the signal received at the detector 524, is configured to control focus of the sample 530 at the detector in response to the detector signal by using information or data of the detector signal to control a position of one or more components of the optical director 510 and/or one or more components of the focusing system 550, as described in detail herein.

Embodiments described herein include a spectral reflectance system comprising a support member. The system includes a detector and a light source coupled to the support member. The system includes a turret coupled to the support member. The turret is configured to receive a plurality of objective lenses and configured to selectively position each lens of the plurality of objective lenses in an imaging position relative to a sample to be imaged. The system includes a first objective lens of the plurality of objective lenses. The first objective lens is configured to image the sample at the detector when placed in the imaging position. The system includes a second objective lens of the plurality of objective lenses. The second objective lens includes an optical director that is configured to form an optical path with an auxiliary detector and image the sample at the auxiliary detector when the second objective lens is in the imaging position.

Embodiments described herein include a spectral reflectance system comprising: a support member; a detector and a light source coupled to the support member; a turret coupled to the support member, wherein the turret is configured to receive a plurality of objective lenses and configured to selectively position each lens of the plurality of objective lenses in an imaging position relative to a sample to be imaged; a first objective lens of the plurality of objective lenses, wherein the first objective lens is configured to image the sample at the detector when placed in the imaging position; and a second objective lens of the plurality of objective lenses, wherein the second objective lens includes an optical director that is configured to form an optical path with an auxiliary detector and image the sample at the auxiliary detector when the second objective lens is in the imaging position.

The turret is selectively moveable to place each objective lens in the imaging position.

The first objective lens when placed in the imaging position is configured to image the sample at the detector using the light source.

The auxiliary detector is independent of the second objective lens.

The auxiliary detector is independent of the detector.

A position of the auxiliary detector is maintained relative to a vertical position of the second objective lens in the imaging position.

The auxiliary detector comprises an auxiliary wavelength range that is different from a wavelength range of the first detector.

The second objective lens is configured to image the sample at the auxiliary detector using the light source.

The optical director comprises at least one mirror, wherein the at least one mirror couples the optical path between the sample and the auxiliary detector via a port of the second objective lens.

The at least one mirror couples the optical path between the light source and the sample.

The optical director includes a beam splitter.

When the second objective lens is in the imaging position a position of the auxiliary detector is maintained relative to the second objective lens.

The position includes a vertical position.

The position includes a horizontal position.

The auxiliary detector is connected to the support, wherein vertical movement of the second objective lens causes vertical movement of the auxiliary detector.

The auxiliary detector includes an auxiliary light source, wherein the second objective lens when placed in the imaging position is configured to image the object at the auxiliary detector using the auxiliary light source.

A wavelength range of the auxiliary light source is different from a wavelength range of the light source.

A position of at least one of the auxiliary detector and the auxiliary light source is maintained relative to a position of the second objective lens in the imaging position.

The auxiliary detector comprises a fiber coupler, wherein a first port of the fiber coupler is coupled to the auxiliary light source, a second port of the fiber coupler is coupled to the auxiliary detector, and a third port of the fiber coupler is coupled to the optical director.

The optical director comprises at least one mirror.

The at least one mirror couples the optical path between the auxiliary light source and the sample via a port of the second objective lens.

The at least one mirror couples the optical path between the sample and the auxiliary detector via a port of the second objective lens.

The auxiliary detector is configured to generate a signal representative of reflected light from the sample and received via the optical director.

The system comprises a focusing system coupled to the optical director, wherein in response to the signal the focusing system automatically focuses light from the auxiliary light source on the sample by controlling a position of the optical director to maximize a strength of the signal.

The optical director comprises a plurality of mirrors.

A first mirror of the plurality of mirrors couples the optical path between the auxiliary light source and the optical director.

A second mirror of the plurality of mirrors couples the optical path between the optical director and the sample.

The focusing system controls a length of the optical path by controlling movement of the optical director relative to the sample.

The system comprises a focusing device in the optical path between the auxiliary light source and the optical director.

The auxiliary light source comprises a light source aperture.

The auxiliary detector comprises a detector aperture.

The focusing system controls the position of the optical director to image the auxiliary light source aperture directly on the auxiliary detector aperture, wherein the strength of the signal is maximized.

The system comprises a fiber coupler, wherein a first port of the fiber coupler is coupled to the auxiliary light source, a second port of the fiber coupler is coupled to the auxiliary detector, and a third port of the fiber coupler is coupled to the optical director in the optical path.

The system comprises a focusing device in the optical path between the third port and the optical director.

The focusing device is positioned adjacent to the sample.

The focusing device comprises at least one of a lens and a focusing mirror.

The optical director comprises a beamsplitter.

The system comprises a first lens positioned between the auxiliary light source and the beamsplitter, wherein the first lens is a collimating lens. The system comprises a second lens positioned between the beamsplitter and the auxiliary detector, wherein the second lens is a focusing lens.

Embodiments described herein include a method comprising configuring a turret of a microscope to receive a plurality of objective lenses and to selectively position each lens of the plurality of objective lenses in an imaging position relative to a sample to be imaged. The turret is coupled to a support member along with a detector and a light source. The method includes positioning a first objective lens of the plurality of objective lenses in the imaging position and imaging the sample at the detector. The method includes positioning a second objective lens of the plurality of objective lenses in the imaging position. The positioning of the second objective lens forms an optical path between an optical director of the second objective lens and an auxiliary detector, and imaging the sample at the auxiliary detector.

Embodiments described herein include a method comprising: configuring a turret of a microscope to receive a plurality of objective lenses and to selectively position each lens of the plurality of objective lenses in an imaging position relative to a sample to be imaged, wherein the turret is coupled to a support member along with a detector and a light source; positioning a first objective lens of the plurality of objective lenses in the imaging position and imaging the sample at the detector; and positioning a second objective lens of the plurality of objective lenses in the imaging position, wherein the positioning of the second objective lens forms an optical path between an optical director of the second objective lens and an auxiliary detector, and imaging the sample at the auxiliary detector.

The method comprises selectively moving the turret to place an objective lens of the plurality of objective lenses in the imaging position.

The method comprises imaging the sample at the detector using the light source and the first objective lens when the first objective lens is in the imaging position.

The method comprises maintaining a position of the auxiliary detector relative to a vertical position of the second objective lens in the imaging position.

The auxiliary detector comprises an auxiliary wavelength range that is different from a wavelength range of the first detector.

The method comprises imaging the sample at the auxiliary detector using the auxiliary light source and the second objective lens when the second objective lens is in the imaging position The method comprises coupling the optical path between the sample and at least one of the auxiliary light source and the auxiliary detector via a port of the second objective lens.

The method comprises maintaining a position of the auxiliary detector relative to the second objective lens when the second objective lens is in the imaging position.

The position includes a vertical position.

The position includes a horizontal position.

The auxiliary detector is connected to the support, wherein vertical movement of the second objective lens causes vertical movement of the auxiliary detector.

The method comprises configuring the auxiliary detector to include an auxiliary light source. The method comprises imaging the object at the auxiliary detector using the auxiliary light source when the second objective lens is placed in the imaging position.

The method comprises configuring the auxiliary light source with a wavelength range different from the wavelength range of the light source.

The method comprises maintaining a position of at least one of the auxiliary detector and the auxiliary light source relative to a position of the second objective lens in the imaging position.

The method comprises configuring the auxiliary detector to comprise a fiber coupler, coupling a first port of the fiber coupler to the auxiliary light source, coupling a second port of the fiber coupler to the auxiliary detector, and coupling a third port of the fiber coupler to the optical director.

The method comprises generating at the auxiliary detector a signal representative of reflected light from the sample and received via the optical director.

The method comprises, in response to the signal, controlling a focusing system to automatically focus light from the auxiliary light source onto the sample.

The method comprises controlling the focusing system by controlling a position of the optical director to maximize a strength of the signal.

The method comprises controlling the focusing system by controlling a length of the optical path by controlling movement of the optical director relative to the sample.

The method comprises configuring the optical path between the auxiliary light source and the optical director to include the focusing device.

The auxiliary light source comprises a light source aperture and the auxiliary detector comprises a detector aperture.

The method comprises the focusing system controlling the position of the optical director to image the auxiliary light source aperture directly on the auxiliary detector aperture, wherein the strength of the signal is maximized.

The method comprises positioning the focusing device adjacent to the sample.

The method comprises configuring the focusing device to comprise at least one of a lens and a focusing mirror.

The method comprises positioning a first lens between the auxiliary light source and the optical director, wherein the first lens is a collimating lens. The method comprises positioning a second lens between the optical director and the auxiliary detector, wherein the second lens is a focusing lens.

Embodiments described herein include a spectral reflectance system, comprising a light source. The system includes a platform configured to retain a sample. The system includes an optical director positioned in the optical path between the light source and the platform. The optical director couples light from the light source to the platform. The system includes a detector positioned to receive reflected light from the sample. The detector generates a signal representing the reflected light. The system includes a focusing system coupled to the optical director. In response to the signal the focusing system automatically focuses the light on the sample by controlling a position of the optical director to maximize a strength of the signal.

Embodiments described herein include a spectral reflectance system, comprising: a light source; a platform configured to retain a sample; an optical director positioned in the optical path between the light source and the platform, wherein the optical director couples light from the light source to the platform; a detector positioned to receive reflected light from the sample, wherein the detector generates a signal representing the reflected light; and a focusing system coupled to the optical director, wherein in response to the signal the focusing system automatically focuses the light on the sample by controlling a position of the optical director to maximize a strength of the signal.

The optical director comprises a plurality of mirrors.

A first mirror of the plurality of mirrors couples the optical path between the light source and the optical director.

A second mirror of the plurality of mirrors couples the optical path between the optical director and the sample.

The focusing system controls a length of the optical path by controlling movement of the optical director relative to the platform.

The system comprises a focusing device in the optical path between the light source and the optical director.

The light source comprises a light source aperture.

The detector comprises a detector aperture.

The focusing system controls the position of the optical director to image the light source aperture directly on the detector aperture, wherein the strength of the signal is maximized.

The system comprises a fiber coupler, wherein a first port of the fiber coupler is coupled to the light source, a second port of the fiber coupler is coupled to the detector, and a third port of the fiber coupler is coupled to the optical director in the optical path.

The system comprises a focusing device in the optical path between the third port and the optical director.

The focusing device is positioned adjacent to the platform.

The focusing device is positioned in a same plane as the platform.

The focusing device comprises a lens.

The focusing device comprises a focusing mirror.

The optical director comprises retroreflector mirrors.

The optical director comprises a first mirror that couples the optical path to the third port of the fiber coupler.

The optical director comprises a second mirror that couples the optical path to the sample.

The optical director comprises a beamsplitter.

The beamsplitter is configured to direct a light signal from the light source to the sample.

The beamsplitter is configured to direct reflected light of the light signal from the sample to the detector.

The focusing system controls a length of the optical path by controlling movement of the beamsplitter relative to the platform.

The system comprises a first lens positioned between the light source and the beamsplitter, wherein the first lens is a collimating lens.

The system comprises a second lens positioned between the beamsplitter and the detector, wherein the second lens is a focusing lens.

The detector comprises a spectrometer.

Embodiments described herein include a spectral reflectance system, comprising a light source coupled to a first port of a fiber coupler. The system includes a platform configured to retain a sample. The system includes an optical director positioned in the optical path between the light source and the platform. The optical director couples light received from the light source via a second port of the fiber coupler to the platform. The system includes a detector coupled to receive reflected light from the sample via a third port of the fiber coupler. The detector generates a signal representing the reflected light. The system includes a focusing system coupled to the optical director. In response to the signal the focusing system automatically focuses the light on the sample by controlling a position of the optical director to maximize a strength of the signal.

Embodiments described herein include a spectral reflectance system, comprising: a light source coupled to a first port of a fiber coupler; a platform configured to retain a sample; an optical director positioned in the optical path between the light source and the platform, wherein the optical director couples light received from the light source via a second port of the fiber coupler to the platform; a detector coupled to receive reflected light from the sample via a third port of the fiber coupler, wherein the detector generates a signal representing the reflected light; and a focusing system coupled to the optical director, wherein in response to the signal the focusing system automatically focuses the light on the sample by controlling a position of the optical director to maximize a strength of the signal.

Embodiments described herein include a method comprising directing light along an optical path from a light source to a platform configured to retain a sample. The optical path includes a first port and a second port of a fiber coupler and an optical director. The method includes positioning a detector to receive reflected light from the sample via the second port and a third port of the fiber coupler. The method includes generating a signal representing the reflected light received at the detector. The method includes, in response to the signal, automatically focusing the light on the sample by controlling a position of the optical director to maximize a strength of the signal.

Embodiments described herein include a method comprising: directing light along an optical path from a light source to a platform configured to retain a sample, wherein the optical path includes a first port and a second port of a fiber coupler and an optical director; positioning a detector to receive reflected light from the sample via the second port and a third port of the fiber coupler; generating a signal representing the reflected light received at the detector; and in response to the signal, automatically focusing the light on the sample by controlling a position of the optical director to maximize a strength of the signal.

Embodiments described herein include a method comprising directing light along an optical path from a light source to a platform configured to retain a sample. The optical path includes an optical director. The method includes positioning a detector to receive reflected light from the sample. The method includes generating a signal representing the reflected light received at the detector. The method includes, in response to the signal, automatically focusing the light on the sample by controlling a position of the optical director to maximize a strength of the signal.

Embodiments described herein include a method comprising: directing light along an optical path from a light source to a platform configured to retain a sample, wherein the optical path includes an optical director; positioning a detector to receive reflected light from the sample; generating a signal representing the reflected light received at the detector; and in response to the signal, automatically focusing the light on the sample by controlling a position of the optical director to maximize a strength of the signal.

The optical director is configured to include a plurality of mirrors.

The method comprises coupling the optical path between the light source and the optical director using a first mirror of the plurality of mirrors.

The method comprises coupling the optical path between the optical director and the sample using a second mirror of the plurality of mirrors.

Automatically focusing the light comprises controlling a length of the optical path by controlling movement of the optical director relative to the platform.

The method comprises focusing light of the light source on the optical director.

The light source comprises a light source aperture.

The detector comprises a detector aperture.

Automatically focusing the light comprises controlling the position of the optical director to image the light source aperture directly on the detector aperture, wherein the strength of the signal is maximized.

The method comprises coupling a first port of a fiber coupler to the light source, coupling a second port of the fiber coupler to the detector, and coupling a third port of the fiber coupler to the optical director in the optical path.

The method comprises focusing light of the light source on the optical director using a focusing device in the optical path between the third port and the optical director.

The method comprises positioning the focusing device adjacent to the platform.

The method comprises positioning the focusing device in a same plane as the platform.

The focusing device comprises a lens.

The focusing device comprises a focusing mirror.

The optical director comprises retroreflector mirrors.

The method comprises coupling the optical path to the third port of the fiber coupler using a first mirror of the optical director.

The method comprises coupling the optical path to the sample using a second mirror of the optical director.

The optical director comprises a beamsplitter.

The method comprises positioning the beamsplitter to direct a light signal from the light source to the sample.

The method comprises positioning the beamsplitter to direct reflected light of the light signal from the sample to the detector.

The method comprises using the focusing system to control a length of the optical path by controlling movement of the beamsplitter relative to the platform.

The method comprises positioning a first lens between the light source and the beamsplitter, wherein the first lens is a collimating lens.

The method comprises positioning a second lens between the beamsplitter and the detector, wherein the second lens is a focusing lens.

The detector comprises a spectrometer.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the light source systems and methods is not intended to be exhaustive or to limit the systems and methods described to the precise form disclosed. While specific embodiments of, and examples for, the light source systems and methods are described herein for illustrative purposes, various equivalent modifications are possible within the scope of other light source systems and methods, as those skilled in the relevant art will recognize. The teachings of the light source systems and methods provided herein can be applied to other processing and measurement systems and methods, not only for the systems and methods described above.

The elements and acts of the various embodiments described above can be combined to provide further embodiments. These and other changes can be made to the light source systems and methods in light of the above detailed description.

In general, in the following claims, the terms used should not be construed to limit the light source systems and methods to the specific embodiments disclosed in the specification and the claims, but should be construed to include all systems and methods that operate under the claims. Accordingly, the light source systems and methods are not limited by the disclosure, but instead the scope of the light source systems and methods is to be determined entirely by the claims.

While certain aspects of the light source systems and methods are presented below in certain claim forms, the inventors contemplate the various aspects of the light source systems and methods in any number of claim forms. Accordingly, the inventors reserve the right to add additional claims after filing the application to pursue such additional claim forms for other aspects of the light source systems and methods.

What is claimed is:

1. A spectral reflectance system comprising:
   a support member;
   a detector and a light source coupled to the support member;
   an auxiliary detector;
   a turret coupled to the support member, wherein the turret is configured to receive a plurality of objective lenses and configured to selectively position each lens of the plurality of objective lenses in an imaging position relative to a sample to be imaged, and wherein the turret is selectively moveable to place each objective lens in the imaging position;
   a first objective lens of the plurality of objective lenses disposed on the turret, wherein the first objective lens is configured to image the sample at the detector using the light source when placed in the imaging position, and wherein the first objective lens includes a first focusing lens disposed in the first objective lens; and
   a second objective lens of the plurality of objective lenses disposed on the turret, wherein the second objective lens includes a second focusing lens and an optical director disposed in the second objective lens, wherein the optical director is configured to form an optical path with the auxiliary detector and image the sample at the auxiliary detector using the light source when the second objective lens is in the imaging position.

2. The spectral reflectance system of claim 1, wherein the auxiliary detector is independent of the second objective lens.

3. The spectral reflectance system of claim 1, wherein the auxiliary detector is independent of the detector.

4. The spectral reflectance system of claim 1, wherein a position of the auxiliary detector is maintained relative to a vertical position of the second objective lens in the imaging position.

5. The spectral reflectance system of claim 1, wherein the auxiliary detector comprises an auxiliary wavelength range that is different from a wavelength range of the first detector.

6. The spectral reflectance system of claim 1, wherein the second objective lens is configured to image the sample at the auxiliary detector using the light source.

7. The spectral reflectance system of claim 1, wherein the optical director comprises at least one mirror, wherein the at least one mirror couples the optical path between the sample and the auxiliary detector via a port of the second objective lens.

8. The spectral reflectance system of claim 7, wherein the at least one mirror couples the optical path between the light source and the sample.

9. The spectral reflectance system of claim 1, wherein the optical director includes a beam splitter.

10. The spectral reflectance system of claim 1, wherein when the second objective lens is in the imaging position and a position of the auxiliary detector is maintained relative to the second objective lens.

11. The spectral reflectance system of claim 10, wherein the position includes a vertical position.

12. The spectral reflectance system of claim 10, wherein the position includes a horizontal position.

13. The spectral reflectance system of claim 10, wherein the auxiliary detector is connected to the support, wherein vertical movement of the second objective lens causes vertical movement of the auxiliary detector.

14. A method comprising:
configuring a turret of a microscope to receive a plurality of objective lenses and to selectively position each lens of the plurality of objective lenses in an imaging position relative to a sample to be imaged, wherein the turret is coupled to a support member along with a detector and a light source;
positioning a first objective lens of the plurality of objective lenses that is disposed on the turret in the imaging position and imaging the sample at the detector using the light source and the first objective lens when the first objective lens is in the imaging position, wherein the first objective lens includes a first focusing lens disposed in the first objective lens; and
positioning a second objective lens of the plurality of objective lenses that is disposed on the turret in the imaging position, wherein the second objective lens includes a second focusing lens and an optical director disposed in the second objective lens, wherein the positioning of the second objective lens forms an optical path between the optical director of the second objective lens and an auxiliary detector, and imaging the sample at the auxiliary detector using the light source and the second objective lens when the second objective lens is in the imaging position.

15. The method of claim 14, comprising selectively moving the turret to place an objective lens of the plurality of objective lenses in the imaging position.

16. The method of claim 14, comprising maintaining a position of the auxiliary detector relative to a vertical position of the second objective lens in the imaging position.

17. The method of claim 14, wherein the auxiliary detector comprises an auxiliary wavelength range that is different from a wavelength range of the first detector.

18. The method of claim 14, comprising maintaining a position of the auxiliary detector relative to the second objective lens when the second objective lens is in the imaging position.

19. The method of claim 18, wherein the position includes a vertical position.

20. The method of claim 18, wherein the position includes a horizontal position.

21. The method of claim 18, wherein the auxiliary detector is connected to the support, wherein vertical movement of the second objective lens causes vertical movement of the auxiliary detector.

* * * * *